United States Patent [19]

Allen

[11] Patent Number: 5,560,143
[45] Date of Patent: Oct. 1, 1996

[54] FISHING PLUG WITH ACTION MODIFIER AND METHOD

[76] Inventor: Terry T. Allen, 202 Harrison Ave., Henderson, N.C. 27536

[21] Appl. No.: 395,436

[22] Filed: Feb. 28, 1995

[51] Int. Cl.⁶ .................................................. A01K 85/16
[52] U.S. Cl. ........................................ 43/42.47; 43/42.48
[58] Field of Search ............................... 43/42.22, 42.47, 43/42.45, 42.53, 42.15, 42.1, 42.03, 42.48

[56] References Cited

U.S. PATENT DOCUMENTS

| | | | |
|---|---|---|---|
| 1,109,439 | 9/1914 | Maus | 43/42.15 |
| 1,232,211 | 7/1917 | Burkman | 43/42.22 |
| 2,387,255 | 10/1945 | Godlewski | 43/42.08 |
| 2,495,134 | 1/1950 | Roberts | 43/42.22 |
| 2,585,783 | 2/1952 | Johnston | 43/42.13 |
| 2,619,760 | 12/1952 | Maddux | 43/42.15 |
| 2,622,363 | 12/1952 | Bodwell | 43/42.24 |
| 2,690,026 | 9/1954 | King | 43/42.24 |
| 2,764,836 | 10/1956 | Webber | 43/42.31 |
| 2,883,785 | 4/1959 | Croft | 43/42.09 |
| 3,344,549 | 10/1967 | Peters et al. | 43/42.24 |
| 4,229,899 | 10/1980 | McGahee | 43/42.09 |
| 4,777,761 | 10/1988 | Renaud | 43/42.47 |
| 4,807,387 | 2/1989 | Dougherty, Jr. et al. | 43/42.09 |

FOREIGN PATENT DOCUMENTS

| | | | |
|---|---|---|---|
| 1529305 | 5/1968 | France | 43/42.15 |

*Primary Examiner*—J. Elpel
*Attorney, Agent, or Firm*—Jacobson, Price, Holman & Stern, PLLC

[57] ABSTRACT

A conventional fishing plug is provided including an elongated body having front and rear ends and wherein at least one of the body ends includes an anchor eye projecting outwardly therefrom. A drag plate having a thin central portion is also provided with a small opening therethrough is provided and installed over one of the aforementioned anchor eyes in a manner such that the one eye projects through the opening. Thereafter, a split ring is secured through at least the one eye for retaining the drag plate thereon. If the one eye comprises the front eye, the split ring is used to attach the free end of the fishing line to the plug and if the one eye comprises the rear eye, the split ring is used to attach a rear multiple barb hook to the rear eye.

15 Claims, 2 Drawing Sheets

FISHING PLUG WITH ACTION MODIFIER AND METHOD

BACKGROUND OF THE INVENTION

1. Field of the Invention

The instant invention relates to an apparatus and method for modifying the "action" and operating depth of a fishing plug. A fishing plug is constructed to perform a fish attracting action either on the surface of a body of water or at varying depths in the body of water. As a conventional fishing plug is pulled over the surface of a body of water or through the water at different depths its construction causes the plug to wiggle from side to side. Further, in order to create a shallow, medium or deep depth operating plug the forward end of the plug is equipped with a small, medium or large size diving fin or lip. The plug of the instant invention incorporates a drag member attached to the rear of the plug which not only reduces the "action" of the plug while moving over the surface of a body of water or through the water below the surface thereof, but further reduces the operating depth of the plug.

2. Description of Related Art

Various different forms of fishing plugs or artificial baits heretofore have been provided with variable "action" modifiers and with different structures for varying the operating depth thereof. Examples of these previously known forms of plugs or artificial baits are disclosed in U.S. Pat. Nos. 1,109,439, 1,232,211, 2,585,783, 2,883,785, 4,229,899, 4,777,761 and 4,807,387. However, these previously known forms of plugs do not include the structural features of the instant invention, nor do they encompass the plug action modifying and operating depth reducing method incorporated in the instant invention.

SUMMARY OF THE INVENTION

The fishing plug of the instant invention may comprise an existing plug which has been modified not only to provide a modified "action" but to also reduce the operating depth thereof.

Most diving fishing plugs utilize a diving lip on the forward end thereof to determine the operating depth of the plug and to impart a wiggling "action" to the plug as it is pulled through a body of water from the front end of the plug. The "action" of most diving plugs can be described as a wiggling motion in an attempt to imitate the wiggling motion of live bait fish attempting to run from predator fish. However, in most instances, the frequency of the wiggling "action" of a diving plug increases as the plug is equipped with progressively larger lips to increase the operating depth thereof. Further, in some water temperature and climatic conditions the action of even a shallow diving plug is deemed to be excessive.

Accordingly, a need exists to provide a means whereby an existing fishing plug may have the "action" thereof reduced.

Also, a fisher person may spend a considerable amount of money on various different types, sizes and different operating depth plugs with the result that a majority of plugs in a fisher person's inventory of plugs are seldom used, although a true fisher person will find it "necessary" to have different types and colors of plugs as well as plugs with different operating depths in order to be assured of having at least three or four plugs which the fisher person feels are proper for a given fishing condition including water color, water clarity, water temperature and atmospheric conditions. Accordingly, a serious fisher person may have as many as fifty or one hundred plugs in addition to other "baits" and large fishing boxes are required to house such large numbers of baits.

A main object of this invention is to provide a method and apparatus by which the "action" of the fishing plug may be substantially modified and further a method and apparatus by which the operating depth of a diving fishing plug may be selectively reduced. In this manner, the number of "necessary" fishing plugs in a serious fisher person's inventory may be substantially reduced and enable the use of a smaller fishing box. Of course, the use of smaller fishing boxes by two or three fisher persons in a relatively small fishing boat substantially increases the volume of the interior of the boat remaining for other supplies and various activities.

Another object of this invention is to provide a method and apparatus for modifying the "action" of a fishing plug so as to more closely simulate the swimming action of crippled bait fish.

Still another object of this invention is to provide a method and apparatus whereby the operating depth of a fishing plug may be selectively varied.

A still further object of this invention is to provide a method and apparatus of modifying a shallow diving plug so that it functions as a surface or "popper" plug.

A final object of this invention to be specifically enumerated herein is to provide a method and apparatus in accordance with the preceding objects which will conform to conventional forms of manufacture, be of simple construction and easy to use so as to provide a device that will be economically feasible, long lasting and relatively trouble fee in operation.

These together with other objects and advantages will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
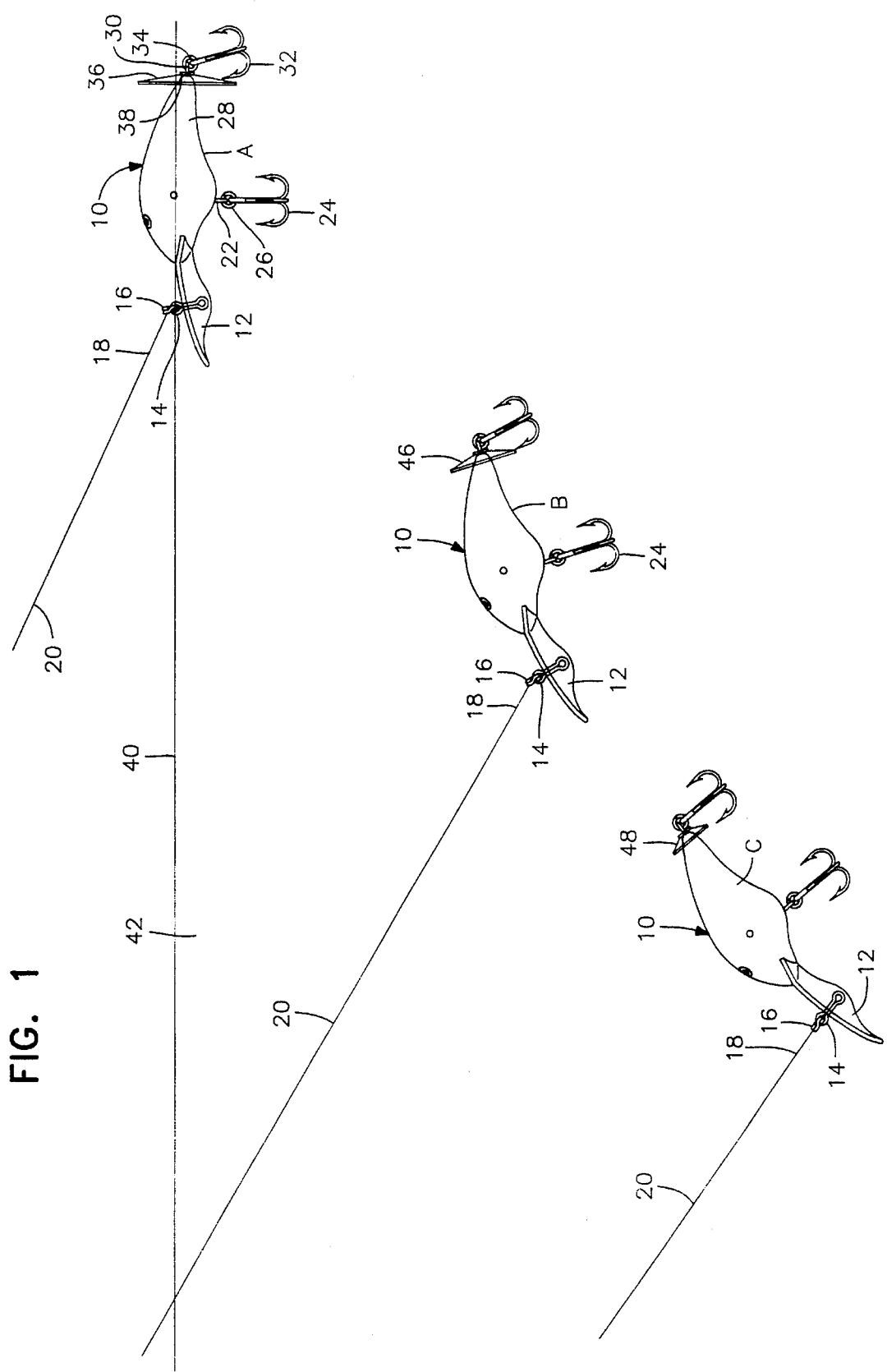
FIG. 1 is a side elevational view illustrating the manner in which a deep diving plug may be modified in accordance with the present invention to operate as surface, shallow or medium depth plug.

Referring now more specifically to the drawings the numeral 10 generally designates a substantially conventional deep diving plug which may be modified in accordance with the present invention to operate as a surface plug A, a shallow diving plug B or a medium diving plug C. The plug 10 includes a large front diving lip 12 to which anchor structure 14 is anchored and a split ring 16 is passed through an exposed eye portion of the anchor structure 14 and may be used to anchor the free end 18 of the fishing line 20 to the anchor structure 14.

The plug A includes a depending central eye 22 to which a treble hook 24 is anchored through the utilization of a split ring 26 and the rear of the body 28 of the plug 10 includes a rearwardly projecting eye 30 to which a second treble hook 32 is anchored through the utilization of a split ring 34, the same structure being incorporated in plugs B and C.

In order to transform the plug A into a surface plug, the split ring 34, and the rear treble hook 32, is removed from the eye 30 and a large diameter slightly concavo convex dish 36 constructed of transparent shape retentive but resilient plastic material and having a relatively thin central portion 38 is provided and has a small opening (not shown) formed through the central portion 38. The central portion 38 is forced forwardly over the eye 30 such that the eye 30 projects through the small central opening in the central portion 38 and the split ring and rear treble hook 34 are then reattached to the eye 36, the split ring 34 being considerably larger in diameter than the eye 30 and thus retaining the central portion 38 of the dish or disk 36 on the eye 36 immediately rearward of the rear end of the body 28.

The large diameter dish or disk 36 creates a sufficient drag at the surface 40 of the body of water 42 at the rear end of the body 28 to prevent the plug A from diving below the surface 40 as the plug A is pulled forward at moderate speeds. Furthermore, the dish or disk 36 attached to the rear of the body 28 tends to stabilize the rear of the body 28 and thus to reduce the wiggling "action" of the body 28 as it is pulled over the surface 40 of the body of water 42. Still further, the dish or disk 36 creates larger air bubbles at the surface 40 and greater noise as the plug A is pulled along the surface 40.

Considering now plug B of FIG. 1, the dish or disk corresponding to the dish 36 applied to the plug B is referred to by the reference numeral 46 and is slightly smaller in diameter than the dish 36. Hence, less resistance to forward movement of the plug B through the body 42 of water is generated and the plug B, normally a deep diving plug, will act as a shallow diving plug.

Concerning plug C of FIG. 1, the dish or disk applied to the rear of the plug C corresponding to the dishes 36 and 46 is referred to by the reference numeral 48 and is even smaller in diameter than the dish 46, thereby even further reducing the resistance to forward movement of the plug C through the body 42 of water. Thus, the normally deep diving plug C is transformed into a medium diving plug.

Figure 2:
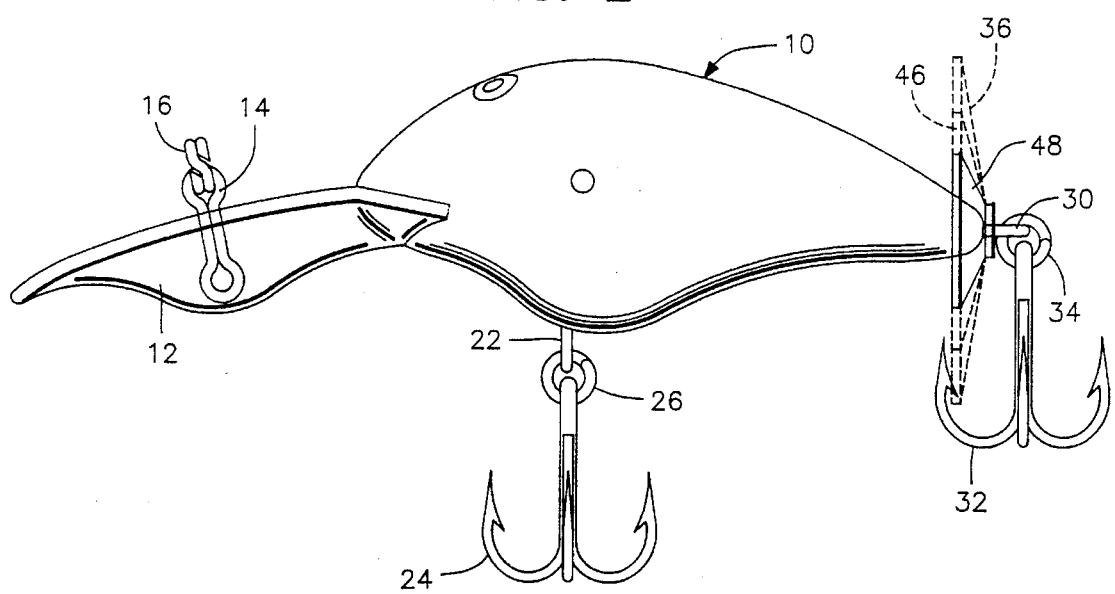
FIG. 2 is an enlarged side elevational view of a deep diving plug which has been modified to operate at medium depth and illustrating, in phantom lines, the manner in which the same plug may be modified to operate at shallow depths and as a surface plug.

FIG. 2 of the drawings illustrates the plug 10 having the small dish 48 mounted thereon in solid lines, the medium size dish 46 mounted thereon in phantom lines and the large size dish 36 mounted thereon in phantom lines.

Figure 3:
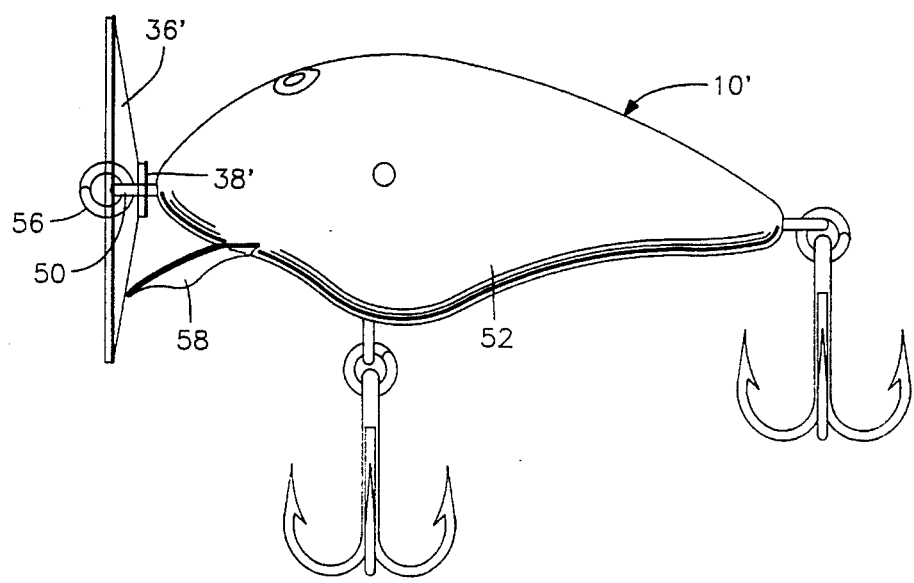
FIG. 3 is a side elevational view of a diving plug which has been modified in an alternate manner to function as a surface plug.

With reference now more specifically to FIG. 3, a shallow diving plug is referred to in general by the reference numeral 10' and includes a forward attaching eye 50 similar to the attaching eye 30 and which projects forwardly of the front end of the body 52 of the plug 10'. A large dish 36' corresponding to the dish 36 has its center portion 38' forced over the eye 50 and a split line attaching ring 54 is attached to the eye 50 forward of the central portion 38' to thereby maintain the dish 36' mounted on the forward end of the body 52 of the plug 10'. Of course, during movement through water the plug 10' has its small diving lip 58 fully shielded from the relative rearward flow of water along the body 52 and therefore totally negates the operation of the lip 58. Further, the dish 36' also is operative to generate larger air bubbles and greater sound as the plug 10' is pulled along the surface of a body of water.

As hereinbefore set forth, the various dishes 48, 46, 36 and 36' are constructed of shape retentive but deformable and resilient transparent plastic material. Accordingly, the eyes 30 and 50 may be readily forced through the small openings in the central portions 38 and 38' of the dishes 36 and 36' in order to mount the dishes upon the bodies 22 and 52. Also, because the split rings 34 and 56 are considerably larger in diameter than the eyes 30 and 50 forced through the central portions 38 and 38', the split rings 34 and 56 ensure that the dishes 48, 46, 36 and 36' are retained upon their respective eyes.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A fishing plug including an elongated body having front and rear ends, each of said ends being equipped with an attaching eye projecting outwardly therefrom and wherein said rear eye has a trailing hook supported therefrom, a drag plate having a central opening formed therethrough and secured over one of said eyes with the latter projecting through said opening, an attaching ring secured through said one eye larger in diameter than said one eye and said opening and retaining the latter against withdrawal through said opening, said drag plate being constructed of pliant, shape retentive material.

2. The fishing plug of claim 1 wherein said body is buoyant.

3. The fishing plug of claim 1 wherein said material is resilient.

4. The fishing plug of claim 3 wherein said material is transparent.

5. The fishing plug of claim 1 wherein said material is resilient and stretchable, said opening being of a diameter smaller in diameter than said eye.

6. The fishing plug of claim 1 wherein said drag plate is circular.

7. The fishing plug of claim 6 wherein said drag plate is slightly cupped in a forwardly opening direction.

8. The fishing plug of claim 7 wherein said material is resilient and stretchable, said opening being of a diameter smaller than the diameter of said eye.

9. A fishing plug including an elongated body having front and rear ends, each of said ends being equipped with an attaching eye protecting outwardly therefrom and wherein said rear eye has a trailing hook supported therefrom, a drag plate having a central opening formed therethrough and secured over one of said eyes with the latter protecting through said opening, an attaching ring secured through said one eye larger in diameter than said one eye and said opening and retaining the latter against withdrawal through said opening, said one eye comprising said rear eye, said trailing hook including a closed anchor eye, said attaching ring being secured through said anchor eye and said one attaching eye.

10. A fishing plug including an elongated body having front and rear ends, each of said ends being equipped with an attaching eye projecting outwardly therefrom and wherein said rear eye has a trailing hook supported therefrom, a drag plate having a central opening formed therethrough and secured over one of said eyes with the latter protecting through said opening, an attaching ring secured through said one eye larger in diameter than said one eye and said opening and retaining the latter against withdrawal through said opening, said front end including a forwardly and downwardly inclined diving lip, said one eye comprising said rear eye.

11. The fishing plug of claim 10 wherein said body is buoyant.

12. The fishing plug of claim 11 wherein said drag plate is constructed of pliant material, said material being resilient and stretchable, said opening being of a diameter smaller in diameter than said eye.

13. The fishing plug of claim 12 wherein said material is transparent.

14. The fishing plug of claim 11 wherein said trailing hook includes a closed anchor eye, said attaching ring being secured through said anchor eye and said one attaching eye.

15. The method of reducing the diving depth of a plug body including a front diving lip and a rear attaching eye projecting outwardly of the rear of said body and having a multiple barb hook means pivoted from said attaching eye through the use of a split ring; said method including removing said split ring from said attaching eye, providing a drag plate having a thin central portion with an opening formed therethrough, installing said drag plate over said attaching eye with the latter projecting through said opening, and reattaching said split ring to said eye.

* * * * *